United States Patent
Bjerke et al.

[11] Patent Number: 6,117,295
[45] Date of Patent: Sep. 12, 2000

[54] METHOD FOR DEHYDRATING A POROUS MATERIAL

[75] Inventors: Egil Bjerke, Madison, Wis.; Henning Olson, Brande, Denmark

[73] Assignee: Drytronic, Inc., La Crosse, Wis.

[21] Appl. No.: 09/060,616

[22] Filed: Apr. 15, 1998

(Under 37 CFR 1.47)

[51] Int. Cl.$^7$ ..................................................... B01D 13/02
[52] U.S. Cl. .................... 204/515; 204/230.2; 204/230.6
[58] Field of Search .................. 204/515, 230.2, 204/230.6

[56] References Cited

U.S. PATENT DOCUMENTS

| | | |
|---|---|---|
| 4,145,270 | 3/1979 | Moraru . |
| 4,479,857 | 10/1984 | Barton, Jr. . |
| 4,600,486 | 7/1986 | Oppitz . |
| 5,015,351 | 5/1991 | Miller . |
| 5,368,709 | 11/1994 | Utklev . |
| 5,396,744 | 3/1995 | Mosley . |
| 5,403,455 | 4/1995 | Candor . |
| 5,755,945 | 5/1998 | Kristiansen . |

FOREIGN PATENT DOCUMENTS

| | | |
|---|---|---|
| 140265 | 2/1982 | Poland . |
| 81067852 | 11/1981 | Sweden . |
| 8601888 | 4/1986 | Sweden . |
| 450264 | 6/1987 | Sweden . |

*Primary Examiner*—Arun S. Phasge
*Attorney, Agent, or Firm*—Reinhart, Boerner, Van Deuren, Norris & Rieselbach, s.c.

[57] ABSTRACT

A method for dehydrating a porous material using electro-osmosis, includes applying a pattern of D.C. voltage pulses to an anode system embedded in the porous material, wherein the anode system is electrically interactive with a cathode structure embedded in earth, and wherein the pattern of D.C. voltage pulses, has a pulse period T in a range from about 3 to about 60 seconds, and each pulse period T includes a positive pulse duration of T+ from about 0.7 T to about 0.97 T, a negative pulse duration of T− from about 0.01 T to about 0.05 T, and a neutral pulse duration of $T_p$ from about 0.02 T to about 0.25 T. In another embodiment, each pulse period includes two or more positive pulses separated by at least one of either a negative pulse or a neutral pulse, with the positive pulse duration being the combined duration of the two positive pulses.

23 Claims, 7 Drawing Sheets

METHOD FOR DEHYDRATING A POROUS MATERIAL

BACKGROUND OF THE INVENTION

The present invention generally relates to a method for dehydrating porous materials, such as moist walls and/or floors of a masonry or concrete structure, as well as the clay containment structure of a landfill, through the use of electro-osmosis. More particularly, the present invention relates to applying a D.C. voltage of a specific pulse pattern to an anode embedded in a porous material, and allowing the voltage to travel through the porous material to a cathode embedded in earth.

Moisture problems in containment structures are common, particularly in building structures located at least partially underground. In addition, modern day efforts to minimize building erection time often do not allow adequate drying time for concrete, leading to moisture problems in the building structure. number of these methods require significant energy and time to achieve the marginal results.

The principle of electro-osmosis was discovered by Professor F. F. Reuss in Moscow in 1807. Electro-osmosis employs a voltage potential difference between two points on opposite sides of a porous material. If the porous structure of the material has been saturated by water, the porous materials assume a negative potential. This causes positive ions in the water to locate around the porous materials to form a so-called electrical double layer. The positive ions will move towards a region having a lower voltage potential. The positive ions are hydrated, and therefore each ion carries a small amount of water, resulting in a water flow toward the lower potential.

There have been a number of commercial attempts to dehydrate building structures using electro-osmosis. In some European countries, a so-called "passive" electro-osmosis system has been employed, wherein a natural potential difference which is created between a moist material and its surroundings is used. This type of installation has yielded marginal results.

In other types of electro-osmosis systems, a direct current or conventional alternating current has been used to generate a potential difference. With these systems, it is only possible to carry water between the anode and cathode over a short period of time, because the forces after some period will reverse such that the electrolyte (water) is transported back to its origin. Efforts were thus directed toward developing a system capable of functioning over an extended period of time, without the so-called "zeta potential" being reversed, meaning that the water returns back to the capillary material. A number of system have been developed utilizing a pulsating direct current, that is where the current is switched between positive and negative potentials. Such systems are described in U.S. Pat. Nos. 5,368,709; 4,600,486; and 5,015,351; as well as in Swedish patent applications 8106785-2 and 8601888-4 (P. Eliassen), Swedish Pat. No. 450264 and Polish Pat. No. 140265 (Basinsky et al.). These known systems have problems relating to the durability of the electrodes on the anode side of the system because the anodes are easily corroded due to a reduction-oxidation phenomenon. In addition, these known systems have not balanced the energy of the positive and negative pulses in voltage-seconds, also denoted as magnetic flux, so that a maximum water flow out of porous material of the structure is obtained without having a further moisturizing of the porous material at a later time.

SUMMARY OF THE INVENTION

It is an object of the invention to provide a novel method and apparatus for dehydrating porous materials which sustains the transport of liquid in the desired direction.

It is a further object of the invention to provide an improved electro-osmotic method and apparatus for dehydrating porous materials which reduces the drying time and lowers the relative humidity compared to known methods.

It is yet another object of the present invention to provide a novel electro-osmotic method and apparatus for dehydrating porous materials to a lower relative humidity level than prior art methods and apparatus.

The above and other objects are accomplished according to the invention by the provision of a method and apparatus for dehydrating a porous material using electro-osmosis, including the steps of: applying a pattern of D.C. voltage pulses to an anode system embedded in the material, the anode system being electrically interactive with a cathode structure embedded in earth, wherein the pattern of D.C. voltage pulses has a pulse period T in a range from about 3 to about 60 seconds, and each pulse period includes a positive pulse duration T+ from about 0.7 T to about 0.97 T, a negative pulse duration T− from about 0.01 T to about 0.05 T and a neutral pulse duration $T_p$ from about 0.02 T to about 0.25 T.

It has been found that by utilizing a pulse pattern according to one preferred embodiment of the invention, an osmotic pressure differential from one side to the other of a structure made of porous material can be sustained which is at least ten times greater than that possible with known electro-osmotic techniques.

In accordance with another preferred embodiment of the invention, each pulse period includes two or more positive pulses separated by at least one of either a negative pulse or a neutral pulse, with the positive pulse duration T+ being the combined duration of the two positive pulses, an even greater osmotic pressure differential is developed.

Other objects, features and advantages of the invention will become apparent from the following detailed description of the invention when taken in conjunction with the accompanying drawings.

DETAILED DESCRIPTION OF THE INVENTION

Figure 1:
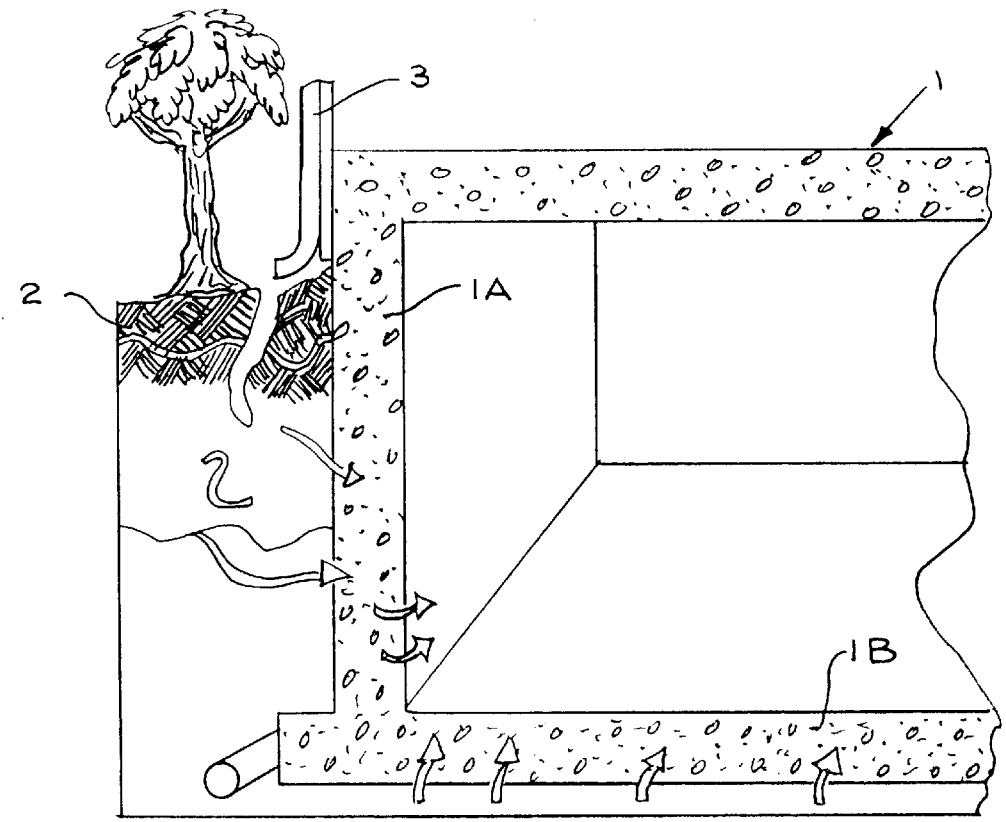
FIG. 1 is a diagram illustrating a conventional environmental situation relating to a building structure of masonry or concrete.

Referring to FIG. 1, there is shown a structure 1 with walls 1a and a floor 1b comprising a porous material, such as masonry and/or concrete, located in the earth 2 below ground level. A conventional drain pipe 3 is shown running from a roof (not shown) close to outer wall 1a. Water will therefore likely seep into the porous wall 1a. Some capillary absorption represented by the arrows in FIG. 1 of the water by the outer wall 1a and by the rest of the masonry structure can create high relative humidity in the space enclosed by walls 1a. Insufficient ventilation of the enclosed space will create a musty, damp atmosphere rendering the space unsuitable for many uses.

Figure 2:
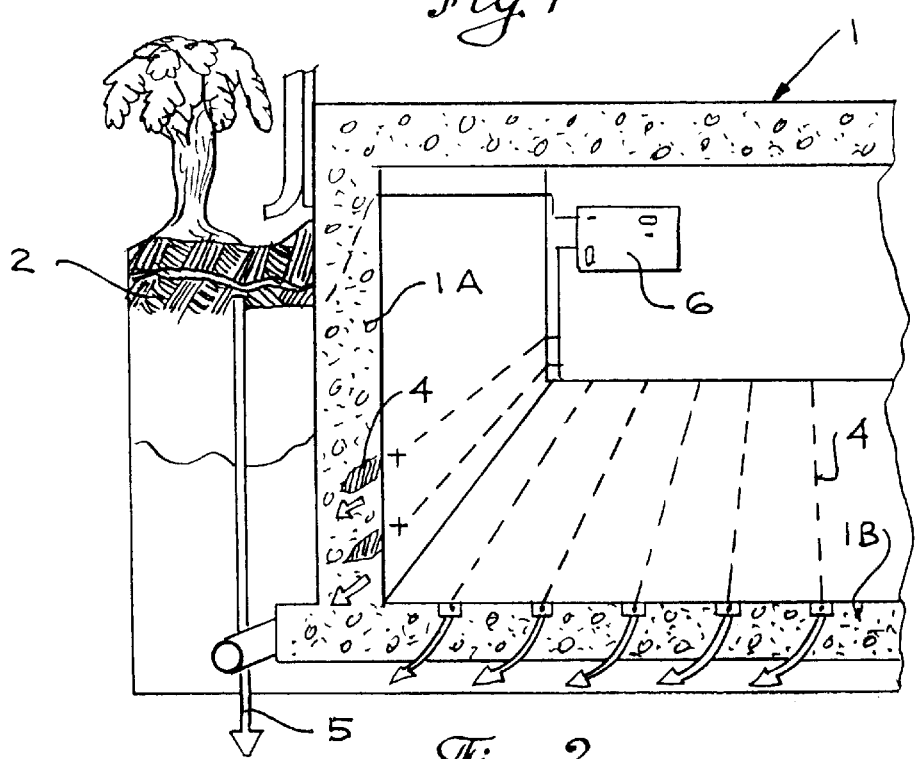
FIG. 2 is a diagram illustrating a basic layout of apparatus for dehydrating porous materials of a building structure which can be utilized for practicing the method of the invention.

FIG. 2, shows a similar building structure 1 which is wired for carrying out electro-osmotic dehydration. Specifically, a number of anodes 4 are provided in the porous walls and/or in the floor of the underground building structure. Preferably, the anodes are comprised of an inert material such as a mixed metal oxide (MMO) ceramic wire anode. Such wire anodes can be obtained from Ceranode Technologies International, which is a division of APS-Material, Inc., Dayton, Ohio, which sells such wire anodes under the trademark CerAnode. Alternatively, the anodes can comprise conventional rubber graphite anodes which conduct current, according to Faraday's law, by movement of electronically conductive carbon ions. One advantage of using a mixed metal oxide anode is that it has a low dissolution rate on the order of one to 10 mg/amp-year. In contrast, conventional rubber graphite anodes have a dissolution rate on the order of 2 kg of carbon/amp-year and therefore have a relatively short life. The MMO wire anodes are preferably installed in thin, 1/16th inch wide grooves cut in the masonry in parallel lines several feet apart as generally shown by the dashed parallel lines in FIG. 2.

A common cathode 5 preferably comprises a copper clad steel rod embedded in the ground as shown in FIG. 2. The anodes and cathode are connected to a power control unit 6 which supplies a D.C. voltage pulse pattern between the anodes 4 embedded in porous material of the building structure and the cathode 5. By applying an appropriate D.C. voltage pulse pattern as discussed below, water travels from a positive potential (+) at the wall to a negative potential (−) at the cathode. Water therefore flows out of the porous material and into the earth 2 as shown by the arrows in FIG. 2.

Figure 3:
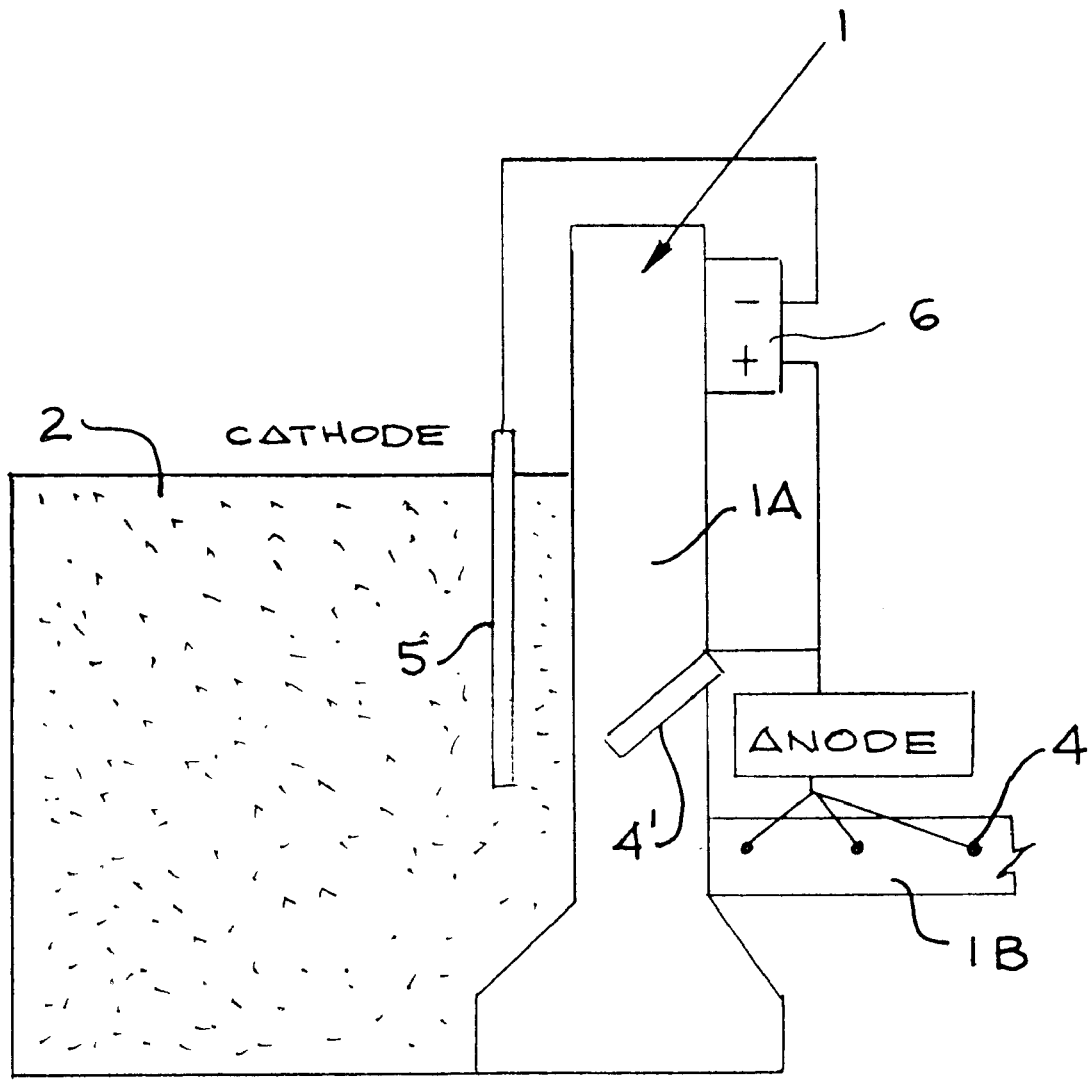
FIG. 3 is a basic circuit diagram for practicing a method according to the invention.

A simplified schematic of the electro-osmotic system is shown in FIG. 3, wherein like reference numerals are used to denote like components. In FIG. 3, the anodes 4' are in the form of rubberized graphite plugs as opposed to the wire anodes illustrated in FIG. 2.

Figure 4:
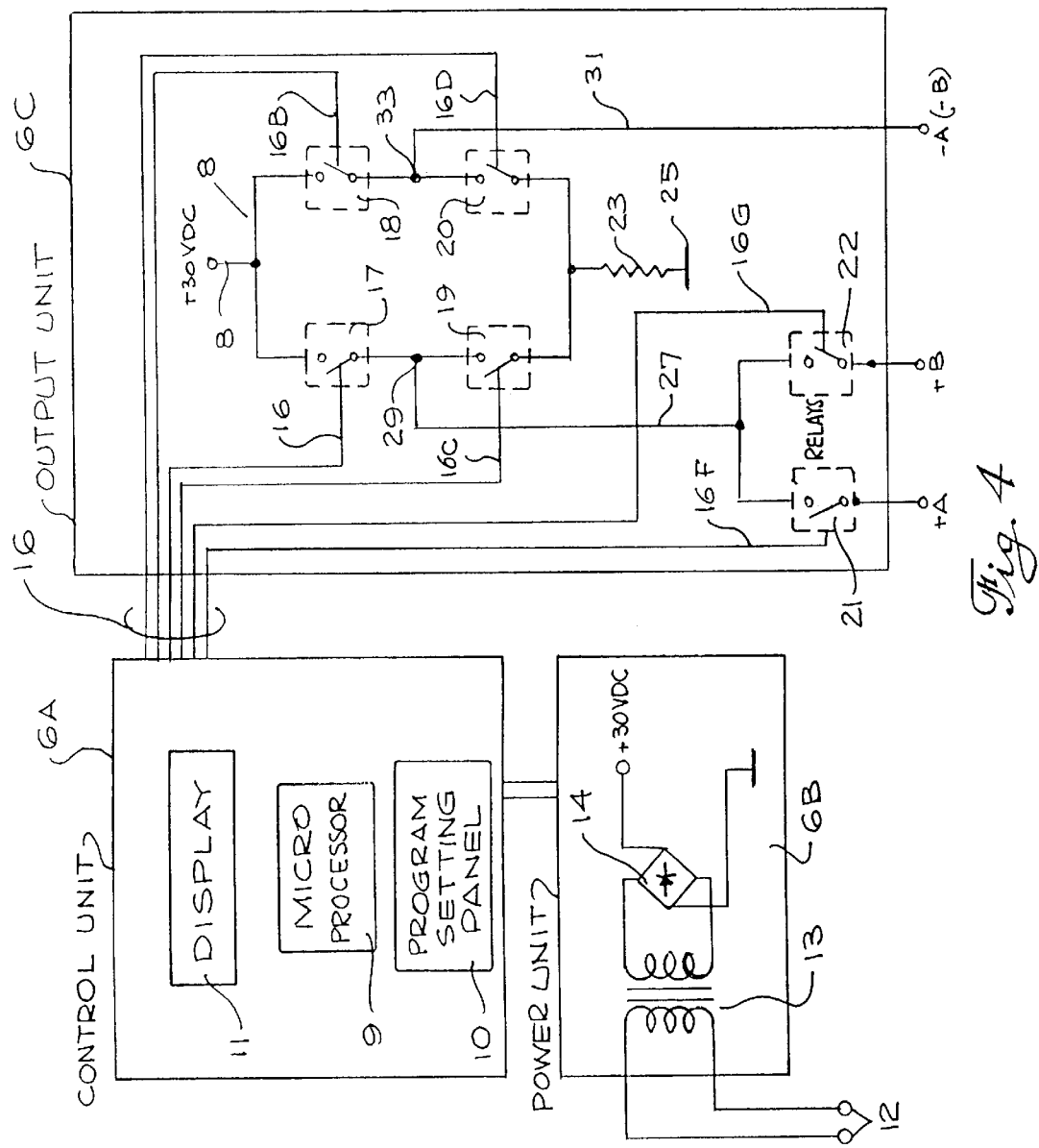
FIG. 4 is a block circuit diagram and circuit schematic for an electrical circuit which can be utilized for carrying out a method according to the invention.

FIG. 4 illustrates the power control unit 6 in more detail. As shown in FIG. 4, the power control unit 6 preferably includes a control unit 6A, a power unit 6B and an output unit 6C. The power unit 6B receives A.C. power at input terminals 12. The A.C. supply voltage is down-converted in a transformer 13, rectified in a rectifier 14, and is suitably stabilized (e, by a conventional capacitor ) to deliver D.C. voltage, for example, 30 volts D.C. to an input 8A of an electronic switch arrangement 8 in the output unit 6C.

The control unit 6A preferably includes a programmable microprocessor 9, a program setting panel 10 and a control display 11. The microprocessor 9 is suitably programmed for producing control signals on control lines 16 which control the operation of electronic switches 17, 18, 19 and 20 in switch arrangement 8 in output unit 6C. The program setting panel 10 permits adjustments to be made in the parameters of the microprocessor program to adjust the control signals on control line 16 for producing a desired pulse pattern at the output of control unit 6C as will be discussed below.

The direct voltage signal at input 8A is preferably coupled to a series connection of electronic switches 17 and 19 and another series connection of switches 18 and 20. Switches 17, 18, 19 and 20 are each individually controlled by a respective control line 16A, 16B, 16C and 16D. Another control line 16E is optionally connected to a common node 7 which is also connected to a terminal of each of switches 19 and 20. A resistor 23 is connected between common node 7 and a ground electrode 25.

FIG. 4 additionally shows two different sets +A and +B of anodes 4 coupled by a line 27 to a node 29 between switches 17 and 19. Line 27 is connected to a terminal of respective controllable relays 21 and 22 which are selectively activated via control lines 16F and 16G for energizing a selected one of the anode sets +A and +B. The common cathode 5 in FIG. 4 is denoted by −A, −B which is connected by a line 31 to a common node 33 between electronic switches 18 and 20. Multiple sets +A and +B of anodes are provided to utilize the overall working capacity of power control unit 6 and its associated circuitry. Different sets of anodes will provide greater operational safety by reducing localized current and also increase dehydration capacity, however, the dehydration process can take longer. Dehydration time can be reduced by increasing the working capacity of the power control unit.

Selectively opening and closing switches 17, 18, 19 and 20 causes a positive, negative or neutral (zero voltage level) pulse to be conducted via line 27 to one or both of the electrodes sets A and B, depending on whether relays 21 and 22 are open or closed. For example, if switches 17 and 20 are closed and switches 18 and 19 are open, the voltage input +25 volts D.C. at input 8A will be applied across anodes +A and/or +B relative to the cathode −A, −B. On the other hand, if switches 17 and 20 are open and switches 18 and 19 are closed, the anode to cathode potential is −25 volts D.C. A neutral or zero voltage level pulse can be produced at the anodes by opening switches 17 and 18 and closing the switches 19 and 20. It will be appreciated by those skilled in the art that control lines 16A to 16D can be controlled by the microprocessor 9 and program setting panel 10 to conduct control signals to switches 17 to 20, thereby creating any desired pulse pattern of positive, negative and neutral pulses at the anodes.

Figure 5A:
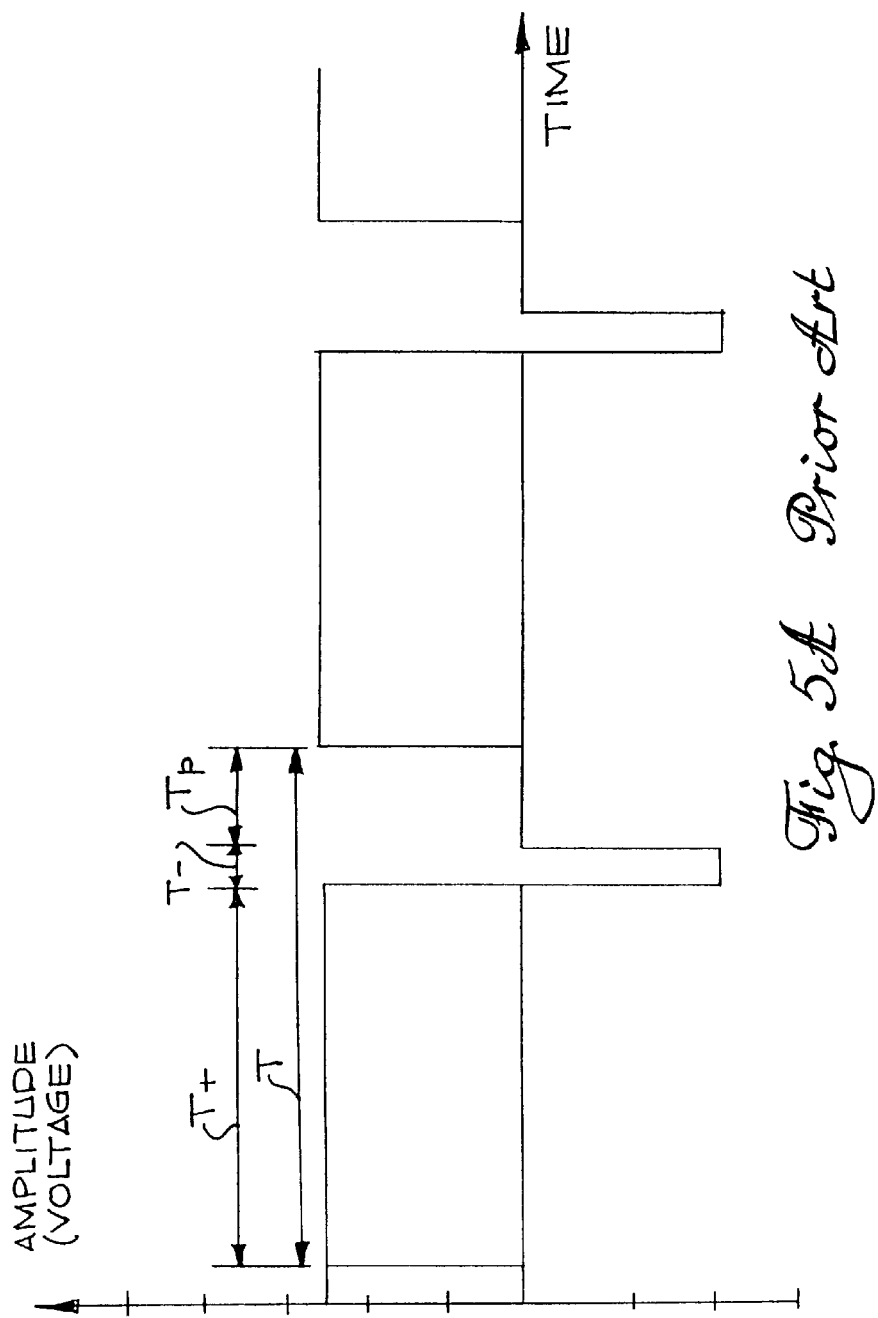
FIG. 5A, which is labeled "Prior Art", is a signal diagram illustrating a prior art pulse pattern.

FIG. 5A illustrates a known pulse pattern which has been utilized in the past for electro-osmotic dehydration. This conventional pattern typically includes a positive pulse duration T+ that is approximately 0.7 T, a negative pulse duration T− of approximately 0.1 T, and a neutral pulse duration $T_p$ of approximately 0.2 T. A pulse pattern of this type is disclosed, for example, in U.S. Pat. No. 5,368,709. The pulse pattern duration disclosed in this patent is 1.4 seconds.

Using this conventional pulse pattern shown in FIG. 5A, with a pulse period of T equal to 3 seconds, it has been found that osmotic pressure gradually increases and levels out at relatively modest levels after a few days.

Figure 5B:
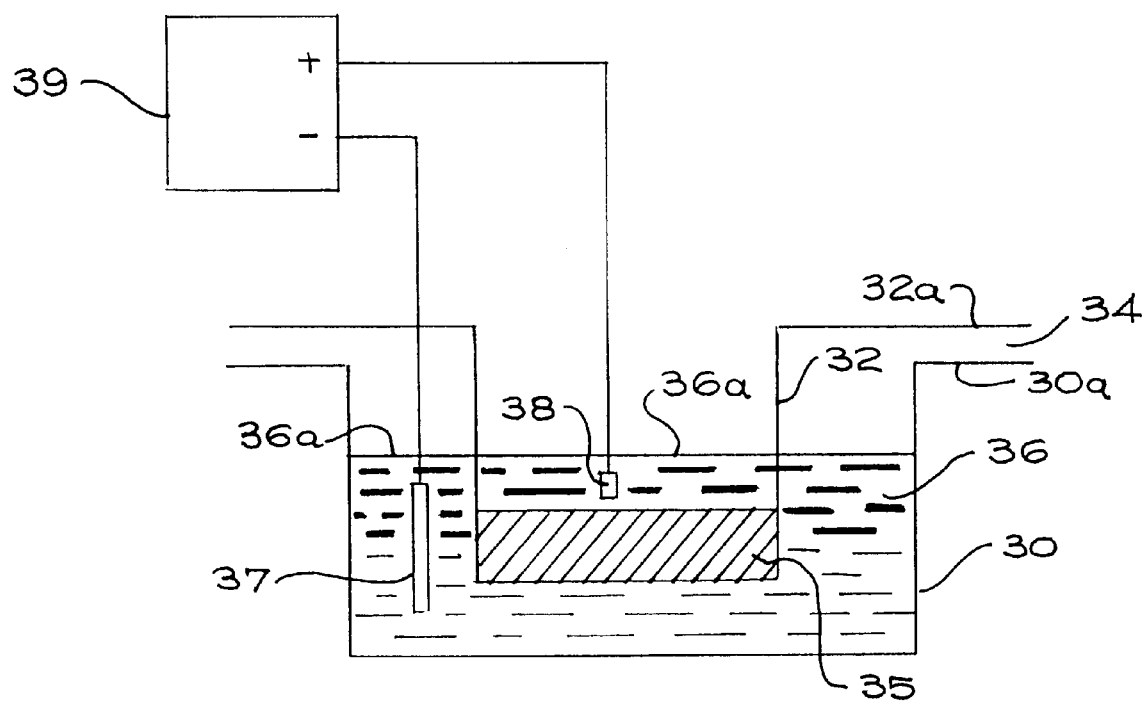
FIG. 5B illustrates a test setup that was used for conducting tests for measuring osmotic pressure produced by different pulse patterns.

Referring to FIG. 5B, a laboratory experiment was conducted to measure osmotic pressure produced by different pulse patterns. The laboratory setup included two tanks 30 and 32 of different sizes. The smaller tank 32, which was bottomless, was supported within the larger tank 30 with the upper edge 32a of the smaller or inner tank 32 spaced apart from the upper edge 30a of the outer tank 30, defining a gap 34. The interior of the inner tank 32 was communicated with the interior of the outer tank by a porous material 35, for this testing, a brick, which was installed in sealed relationship with the open bottom of the inner tank 32. The tanks 30 and 32 were filled with water 36 to the same initial level 36a above the brick 35. An anode 37 was placed in the outer tank 30. A cathode 38 was placed in the water 36 in the inner tank 32. The anode 37 and the cathode 38 were connected to outputs of a control unit 39. The control unit created direct voltage pulse patterns at the anode 37 relative to the cathode 38.

Figure 7:
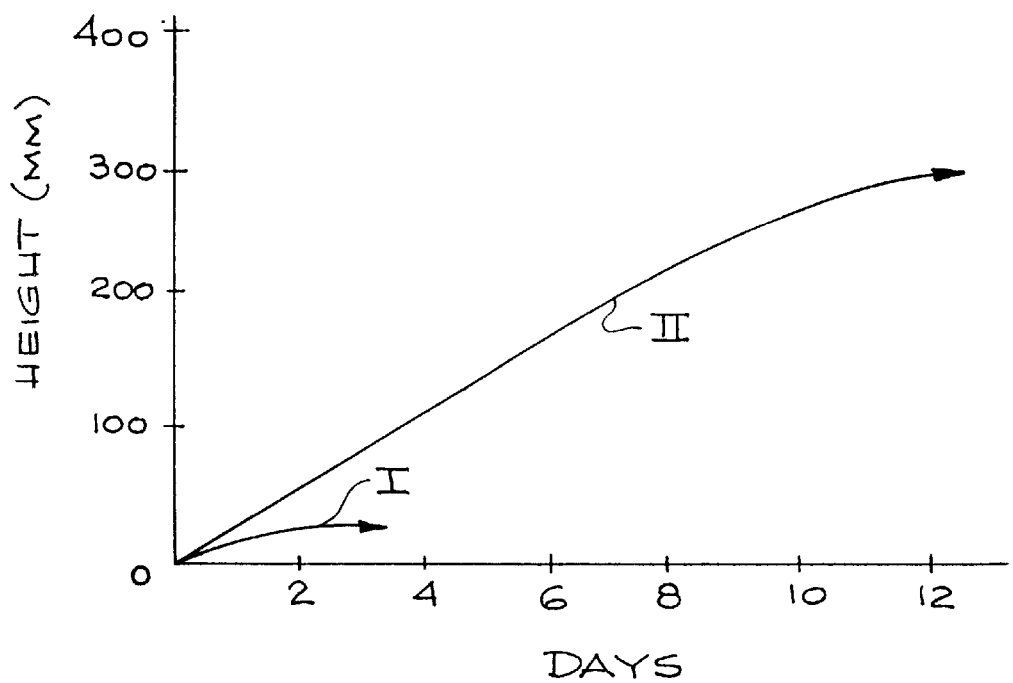
FIG. 7 is a graph showing water column rise in millimeters which represents rising osmotic pressure over a period of days utilizing different pulse patterns.

A pulse pattern having the characteristics of FIG. 5 with the positive, negative and neutral duration periods T+, T−, and $T_p$, respectively, as discussed above, resulted in a 30 mm rise of the water level in the tank 32 containing the cathode 38. No further water level change was observed after about 48 hours. These test results are represented by curve I in FIG. 7.

Surprising and convincing results based on extensive testing and verification of the effectiveness of preferred embodiments of the present invention have established that varying certain pulse parameters increases dehydrating effectiveness.

A series of tests were conducted using a different set of pulse parameters for each test of the series of tests. For the testing, equal positive and negative pulse magnitudes of 20, 40 and 66 volts were used in the testing of each of several pulse patterns. In addition, for each pulse pattern and each voltage magnitude, a test was conducted for pulse pattern durations of 3, 6, 10, 20, 30 and 60 seconds. In the following description, each pulse pattern is represented by a sequence of three numbers separated by a hyphen, wherein the first number is the positive pulse duration T+, the second number is the negative pulse duration T−, and the third number is the neutral pulse duration $T_p$. For the initial testing, the pulse patterns that were used in the testing were as follows:

| | | |
|---|---|---|
| 60-15-25 | 80-10-10 | 70-10-20 |
| 75-10-15 | 85-5-5 | 90-5-5 |

In accordance with the convention referred to above, the pulse pattern 60-15-25, for example, has a positive pulse duration T+ of 60, a negative pulse duration T− of 15, and a neutral pulse duration $T_p$ of 25. The testing was conducted for each of these six pulse patterns using the voltage magnitudes and pulse pattern durations stated above. The duration of the test for each set of parameters was 48 hours.

The test results showed that changing the voltage magnitude did not significantly impact the amount of increase in the height of the water in the inner tank. Moreover, the testing demonstrated that the best results were obtained when the duration of the pulse pattern was between 6 and 10 seconds. In addition, more favorable results were obtained for pulse patterns in which the positive side pulses represented 90% or more of the duration T of the pulse pattern.

Accordingly, further testing was conducted using pulse patterns having a total duration T of 6 seconds. The tests were conducted for a period of 48 hours. The positive and negative pulse magnitudes were 40 volts. Two tests, Test A and Test B, were conducted for each set of parameters. At the end of each test period, the height of the water in the inner tank 32 was measured, and the measurement data was recorded. The results of the further testing is summarized in TABLE I, for the two tests, Test A and Test B. Each pulse pattern is represented by the three number sequence of the convention referred to above in which the first number of the sequence is the positive pulse duration T+, the second number of the sequence is the negative pulse duration T−, and the third number of the sequence is the neutral pulse duration $T_p$.

TABLE I

| | Increase in Height | |
|---|---|---|
| Pulse Pattern | Test A | Test B |
| 85-5-10 | 38 mm | 30 mm |
| 90-5-5 | 52 mm | 38 mm |
| 75-20-5 | 41 mm | 26 mm |
| 80-15-5 | 48 mm | 33 mm |
| 85-10-5 | 53 mm | 37 mm |
| 70-29-1 | 31 mm | 22 mm |
| 80-19-1 | 45 mm | 32 mm |
| 90-9-1 | 60 mm | 43 mm |
| 70-1-29 | 47 mm | 34 mm |
| 80-1-19 | 54 mm | 38 mm |
| 90-1-9 | 57 mm | 41 mm |
| 95-1-4 | 58 mm | 45 mm |

The difference in the results for Test A and Test B can be attributed to different chloride and pH levels in both the water and the brick 35. To confirm the results of these tests, further testing was conducted using pulse patterns selected from the initial tests, including pulse patterns 70-1-29, 80-1-19, 90-1-9 and 95-1-4 along with another pulse pattern 85-1-14. For these tests, each of the pulse patterns had a pulse period T of six seconds. The pulse patterns included equal positive and negative pulse amplitudes of 40 volts D.C. The test for each pulse pattern was conducted for a period of 48 hours. The height of the water in the inner tank was measured at the end of each of the tests. The results of these tests are summarized in TABLE II. The test data, arranged in ascending order for the positive pulse duration, demonstrates that a greater increase in height of the water was provided for longer positive pulse periods. The increase in the height of the water in the inner tank ranged from 30 mm to 45 mm for Test A and from 40 mm to 55 mm for Test B. The greatest increase in height was provided for the pulse pattern 95-1-4, which had the longest positive pulse duration for this series of tests.

TABLE II

| | Increase in Height | |
|---|---|---|
| Pulse Pattern | Test A | Test B |
| 70-1-29 | 30 mm | 40 mm |
| 80-1-19 | 35 mm | 45 mm |
| 85-1-14 | 37 mm | 47 mm |
| 90-1-9 | 42 mm | 54 mm |
| 95-1-4 | 45 mm | 55 mm |

In view of the favorable results obtained using the pulse pattern 95-1-4 for the 48 hour test period, further testing was conducted over a longer time period, which was twelve days for these tests. The further testing was conducted using the pulse pattern 95-1-4 and having a pulse period T equal to six seconds, and with equal positive and negative pulse amplitudes of 40 volts D.C. At the end of each test period, the height of the water in the inner tank 32 was measured and the measurement was recorded.

The results obtained for the further testing are summarized in TABLE III for two tests with the measurement data obtained for the two tests being labeled Test A and Test B. As can be seen, for Test A, the height of the water in the inner tank 32 (FIG. 5B) increased from 0 to 310 mm in the twelve day test period. For Test B, the height in the water in the inner tank increased from 0 to 245 mm in twelve days. The difference in the results between Test A and Test B can be attributed to different chloride and pH levels in both the water and the brick 35.

TABLE III

| Date (time) | | Increase in Height | |
|---|---|---|---|
| | | Test A | Test B |
| 3/25 | (1510) | 0 mm | 0 mm |
| 3/26 | (2030) | 31 mm | 20 mm |
| 3/27 | (1905) | 53 mm | 37 mm |
| 3/28 | (0930) | 70 mm | 51 mm |
| 3/29 | (1345) | 96 mm | 70 mm |
| 4/01 | (0820) | 157 mm | 118 mm |
| 4/02 | (1420) | 182 mm | 138 mm |
| 4/03 | (1320) | 200 mm | 153 mm |
| 4/06 | (1140) | 250 mm | 192 mm |
| 4/07 | (2045) | 274 mm | 212 mm |
| 4/09 | (0955) | 296 mm | 231 mm |
| 4/10 | (0750) | 310 mm | 245 mm |

In contrast, using the known pulse pattern 70–10–20, as disclosed in U.S. Pat. No. 5,368,709, the height of the water in the inner tank increased from 0 to only 30 mm over a period of three days. No measurable increase in height was noted after the first three days.

Further testing was conducted in which the percentage of the positive pulse time, i.e., the positive pulse duration T+, was selected to be 0.90 T and 0.95 T for a pulse pattern duration T of 6 seconds. In the two tests, Test A and Test B, for which T+ was 0.90 T, the negative pulse duration T− was increased to 0.05 T. In the tests, Test A and Test B, for which T+ was 0.95, the negative pulse duration T− was increased to 0.04 T. The results of these tests are summarized in TABLE IV.

TABLE IV

| Pulse Pattern | Increase in Height | |
|---|---|---|
| | Test A | Test B |
| 95-4-1 | 51 mm | 40 mm |
| 90-5-5 | 45 mm | 36 mm |

For Test B which used the pulse pattern 95–4–1, the increase in the height of the water was 40 mm.

Further testing was conducted in which the percentage of the positive pulse time, i.e., the positive pulse duration T+, was decreased, and the negative pulse duration T− was increased. The results of these tests are summarized in TABLES V and VI.

TABLE V

| Pulse Pattern | Increase in Height | |
|---|---|---|
| | Test A | Test B |
| 75-10-15 | 39 mm | 30 mm |
| 80-10-10 | 40 mm | 32 mm |

TABLE VI

| Pulse Pattern | Increase in Height | |
|---|---|---|
| | Test A | Test B |
| 60-15-25 | 28 mm | 20 mm |
| 70-10-20 | 37 mm | 28 mm |

As can be seen, using a smaller percentage positive pulse duration resulted in a reduced increase in the height of the water in the inner tank. In particular, the pulse pattern 70–10–20, which is similar to that used in the U.S. Pat. No. 5,368,709, provided an increase of only about 28 to 37 mm with the longer pulse pattern duration of 6 seconds, as compared to the 1.4 second pulse pattern which is disclosed in this patent.

Although the use of smaller percentage positive pulse durations may result in smaller increases in the height of the water in the inner tank, in preferred embodiments, pulse patterns having $0.70 \text{ T} < T+ \leq 0.97 \text{ T}$; $0.01 \text{ T} < T- \leq 0.05 \text{ T}$; $0.02 \text{ T} < T_p \leq 0.25 \text{ T}$ can be used to provide better results than prior art methods and apparatus. Moreover, although the most favorable results are obtained when the duration of the pulse pattern is between about 6 and 10 seconds, pulse patterns having a duration of 3 seconds $< T \leq 60$ seconds are quite effective.

Figure 6A:
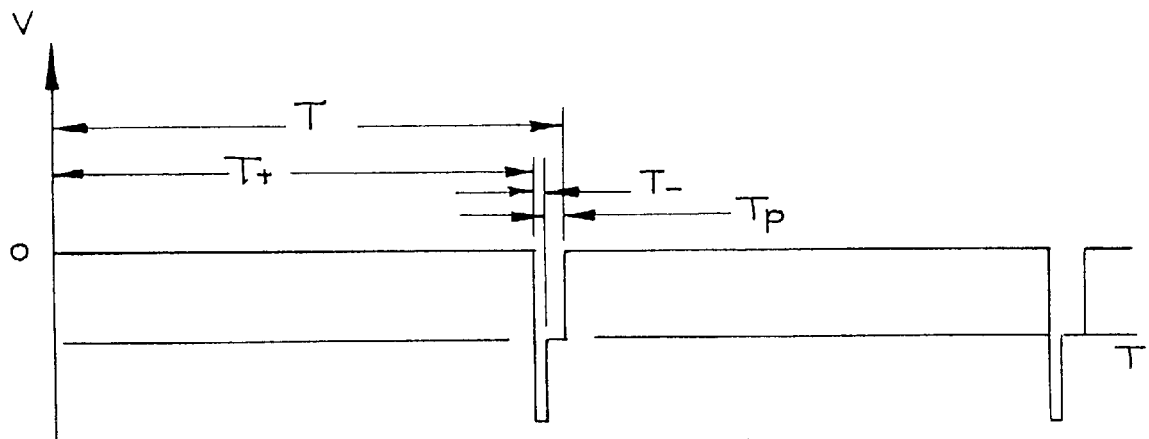
FIG. 6A is a signal diagram illustrating a pulse pattern according to one aspect of the present invention.

For porous materials in particular, $T+=0.95 \text{ T}$; $T-=0.01 \text{ T}$; and $T_p=0.04 \text{ T}$, (FIG. 6A) provide a dehydrating efficiency which is significantly better than that yielded by the prior art pulse pattern shown in FIG. 5A. The long time laboratory testing with a pulse pattern according to this embodiment of the invention has shown that the present invention provides a method that, even for a long term dehydration process, eliminates reverse travel of the dehydrating fluid. In the above-mentioned laboratory test, the water column level (curve II in FIG. 7) rose steadily over the test period at a rate 10 times as great as that of the prior art pulse pattern (curve I in FIG. 7). Although the pulse pattern, according to the invention, can provide positive and negative pulses of substantially equal magnitude, a pulse pattern where the positive and negative pulse amplitudes are unequal can also be used effectively. The positive pulse preferably is selected in the range from about +12 volts to +250 volts D.C. The negative pulse preferably is selected in the range from about −12 volts to about −250 volts D.C.

The total pulse period T can be greater than 3 seconds, but, less than or equal to 60 seconds. In a most highly preferred embodiment, the pulse period T between about 6 and 10 seconds. However, it would be possible to set the duration of the total pulse period T to other values in the range, while retaining the pulse duration ranges for T+, T− and $T_p$ as indicated above.

Figure 6B:
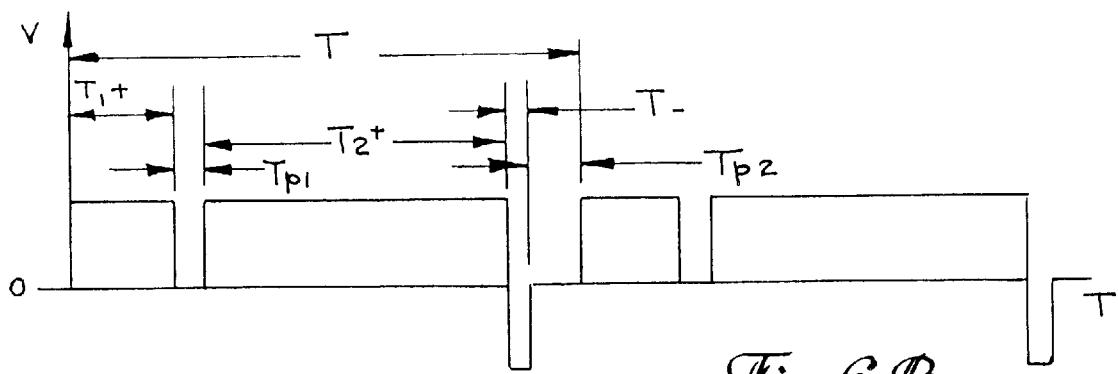
FIG. 6B is a signal pattern illustrating a pulse pattern according to another aspect of the present invention.
Figure 6C:
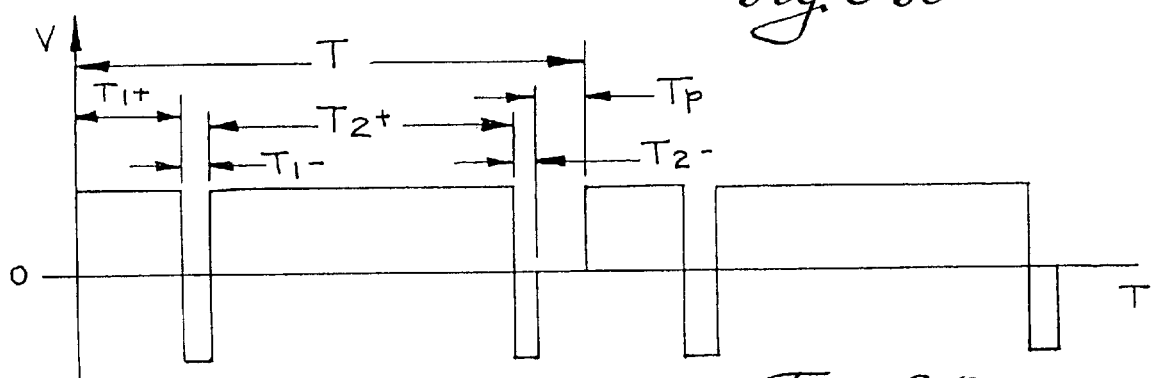
FIG. 6C is a signal pattern illustrating a pulse pattern according to another aspect of the present invention.

According to a further aspect of the invention, an even greater osmotic pressure can be developed within the context of the invention by dividing the positive pulse duration of each pulse period T into two or more separate positive pulses $T_1+$ and $T_2+$ separated by at least one of either a short duration (e.g. 0.05 T) neutral pulse $T_{p1}$, as shown in FIG. 6B or negative pulse $T_1-$ as shown in FIG. 6C. In one preferred embodiment, the pulse durations of the pulse pattern of FIG. 6B, in the order of occurrence in the period T, are as follows:

$$T_1+=0.2 \text{ T}; T_{p1}=0.05 \text{ T}; T_2+=0.6; T-=0.01 \text{ T}; T_{p2}=0.1 \text{ T}$$

where $T_{p2}$ is the second occurrence of a neutral pulse within the period T.

In a highly preferred embodiment, the pulse durations of the pulse pattern of FIG. 6B, in the order of occurrence in the pulse period T are as follows:

$T_1+=0.2$ T; $T_{p1}=0.05$ T; $T_2+=0.7$; $T-=0.02$ T; $T_{p2}=0.3$ T where $T_{p2}$ is the second occurrence of a neutral pulse within the period T having a 10 second duration.

In yet another embodiment, the pulse pattern was:

$T_1+=0.15$ T; $T_{p1}=0.05$ T; $T_2+=0.60$; $T-=0.05$ T; $T_{p2}=0.15$ T where $T_{p2}$ is the second occurrence of a neutral pulse within the period T. The duration of the period T was 10 seconds.

In one embodiment, the pulse durations of the pulse pattern of FIG. 6C, in the order of occurrence in the pulse period T are as follows:

$T_1+=0.2$ T; $T_1-=0.05$ T; $T_2+=0.6$; $T_2-=0.05$ T; $T_p=0.1$ T where $T_2-$ is the second occurrence of a negative pulse within the period T.

Further testing was conducted using the highly preferred pulse pattern in which $T_1+=0.2$ T; $T_{p1}=0.05$ T; $T_2+=0.7$; $T-=0.02$ T; $T_{p2}=0.3$ T, and wherein duration of the period T was 10 seconds. For the test using this pulse pattern, the height of the water in the inner tank increased by 420 mm. This represented a 25% increase over the 310 height increase that was obtained using a pulse pattern 95-1-4, for which the period T was ten seconds. As has been stated above, the height increase provided using the pulse pattern 95-1-4 was ten times greater than that produced using the known pulse pattern of 70-10-20.

The results of the previously discussed laboratory test with pulse durations as shown in FIGS. 6B and 6C show an even greater rate of increase in osmotic pressure, the water level reaching 40 mm of after 48 hours and continuing to rise thereafter to 420 mm in a twelve day test period.

An important advantage of using the method and apparatus of the invention for dehydrating porous material is that power consumption is less than that for known electro-osmotic processes. The pulse patterns and pulse pattern durations according to the invention cause a higher level of moisture to be removed from the porous structure in a shorter period of time as compared to results obtained using known techniques. As the porous material becomes dryer, electrical power use decreases automatically due to the lack of moisture and increased resistance of the porous material.

The present invention also reduces the relative humidity of the porous structure to a stable level of about 50 percent, compared to stable levels of about 80 percent or greater left by prior art methods and apparatus. Tests were conducted to determine the reduction in relative humidity levels provided by different pulse patterns. The tests were conducted in a containment structure having porous walls that are normally subjected to very high relative humidity, at levels exceeding 90 percent. In conducting these tests, a humidity sensor was inserted into a hole approximately 1 inch deep in a wall of the containment structure.

One test conducted used the known pulse pattern as disclosed in U.S. Pat. No. 5,368,709, having the characteristic of FIG. 5, with a positive duration T+ of 70 percent, a negative duration T− of 10 percent and a neutral duration $T_p$ of 20 percent. The pulse pattern was applied to the anode relative to the cathode. The duration of the pulse pattern was 1.3 seconds. This pulse pattern (70–10–20) resulted in a reduction in relative humidity of the porous material to a stable level of about 79 percent.

Further testing was conducted using the pulse pattern in accordance with the invention which had the characteristic of FIG. 6B, in which the positive pulse duration of each pulse period T is divided into separate positive pulses $T_1+$ and $T_2+$, separated by a short duration pulse neutral pulse $T_{p1}$, and followed by a negative pulse T− which, in turn, was followed by a further neutral pulse $T_{p2}$. For one test that was conducted, the pulse pattern was: $T_1+=0.15$ T; $T_{p1}=0.05$ T; $T_2+=0.60$; $T-=0.05$ T; $T_{p2}=0.15$ T. The duration of the period T was 10 seconds. For this testing, the humidity sensor was located in the same hole in the wall of the structure that was used for the test that used the known pulse pattern. The pulse pattern was applied to the anode relative to the cathode. The further testing was conducted after a delay in time, following the test using the known pulse pattern, sufficient to allow the relative humidity of the porous material to be returned to near 90 percent. This pulse pattern (15–5–60–5–15) resulted in a reduction in relative humidity of the porous material to a stable level of about 52 percent. In general, mold growth cannot be supported below 65 percent relative humidity. It is well known that harmful fungus cannot survive or grow at relative humidity levels provided by the present invention. In addition, recent testing has confirmed that electro-osmotic pulsing can be used to deter radon gas penetration. Preliminary results have shown a potential 85% reduction in radon diffusion when the electro-osmotic pulsing system is in operation. Thus, the present invention can be used for reducing radon in homes and other buildings. Accordingly, contaminated structures can now be saved using the present invention.

Figure 8:
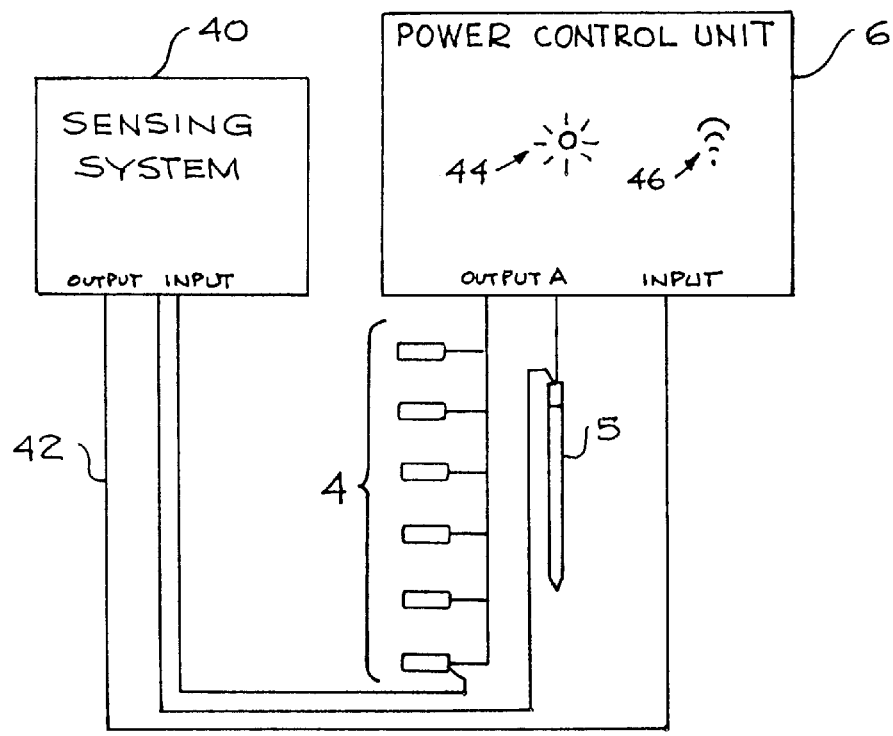
FIG. 8 illustrates a partial block diagram according to another aspect of the invention.

FIG. 8 shows a circuit diagram illustrating another feature of the invention, wherein a sensing system 40 is connected in the circuit between the anodes 4 and the cathode 5 sensing various parameter values to determine if the electro-osmotic system is functioning properly. If the parameter values sensed exceed predetermined limits, the sensing system 40 produces an alarm signal on the line 42 which is input to power control unit 6 for producing either a visual alarm in the form of a light 44 or an audible alarm 46.

The sensing system 40 can sense, for example, when there is a loss of output power in power control unit 6. Loss of output power would be indicated if the voltage between the anodes 4 and the cathode 5 is zero for a predetermined period of time. Additionally, the sensing system 40 can determine if an upper voltage of lower voltage limit is exceeded, whether an upper current limit is exceeded or whether there is a sudden current drop, all of which can indicate a system error. The sensing system 40 can be implemented by a microcontroller which can be programmed for sensing the above parameters as well as other important system parameters. The power control unit 6 can itself have internal sensors for activating visual alarm 44 or audible alarm 46. For example, the power control unit 6 can include a temperature sensor (not shown) for producing a signal if the temperature within the power control unit 6 exceeds a predetermined limit indicating a system problem.

The electro-osmotic dehydration methods and apparatus of the invention are not only applicable to conventional masonry and concrete, but can be applied to any containment structure made of porous material including, for example, a clay containment structure of a landfill.

The invention has been described in detail with respect to preferred embodiments, and it will now be apparent from the foregoing to those skilled in the art, that changes and modifications can be made without departing from the invention in its broader aspects, and the invention, therefore, as defined in the appended claims, is intended to cover all such changes and modifications as to fall within the true spirit of the invention.

What is claimed is:

1. A method for dehydrating a porous material using electro-osmosis, comprising the steps of:

applying a pattern of D.C. voltage pulses to an anode system embedded in the porous material, the anode system being electrically interactive with a cathode structure embedded in earth, wherein the pattern of D.C. voltage pulses has a pulse period T in a range from about 3 to about 60 seconds, and each pulse period T includes a positive pulse duration of T+ from about 0.7T to about 0.97T, a negative pulse duration of T− from about 0.01T to about 0.05T, and a neutral pulse duration of $T_p$ from about 0.02T to about 0.25T, and wherein each pulse period includes at least two positive pulses separated by at least one of a second negative pulse and a second neutral pulse, and the positive pulse duration of each pulse period comprises a combined duration of the two positive pulses.

2. The method according to claim 1, wherein each pulse period includes positive and negative pulses of substantially equal voltage magnitudes.

3. The method according to claim 1, wherein each pulse period includes positive and negative pulses of unequal voltage magnitudes.

4. The method according to claim 1, wherein each pulse period includes positive and negative pulses having voltage magnitudes in a range from about 12 volts to about 250 volts.

5. The method according to claim 1, wherein $0.80T \geq T+ \geq 0.95T$; $0.01T \geq T- \geq 0.05T$ and $0.04T \geq T_p \geq 0.15T$.

6. The method according to claim 1, wherein $0.90T \geq T+ \geq 0.95T$; $0.01T \geq T- \geq 0.05T$ and $0.1T \geq T_p \geq 0.05T$.

7. The method according to claim 1, wherein the pulse period duration T is between about 6 seconds and 10 seconds.

8. The method according to claim 1, wherein said at least two positive pulses are separated solely by said at least one of a second negative pulse and a second neutral pulse.

9. The method according to claim 8, wherein $0.8 T \geq T+ \geq 0.95 T$; $0.01 T \geq T- \geq 0.05T$ and $0.04 T \geq T_p \geq 0.15 T$.

10. The method according to claim 1, wherein the two positive pulses are separated by only a negative pulse.

11. The method according to claim 1, wherein the two positive pulses are separated by only a neutral pulse.

12. The method according to claim 1, wherein the two positive pulses are of unequal duration.

13. The method according to claim 12, wherein a ratio of the duration of the two positive pulses is at least 1:3.

14. The method according to claim 1, further comprising: connecting a sensing system in circuit with the anode system and cathode structure for sensing system parameter values outside predetermined limits; and generating an alarm when the predetermined limits are exceeded.

15. The method according to claim 14, wherein the system parameters that are sensed include at least one of loss of power for a given time period, an upper voltage limit, a lower voltage limit, an upper current limit and a sudden current drop.

16. A method for dehydrating a porous material using electro-osmosis, comprising the steps of:
applying a pattern of D.C. voltage pulses to an anode system embedded in the porous material, the anode system being electrically interactive with a cathode structure embedded in earth, wherein the pattern of D.C. voltage pulses has a pulse period T, and each pulse period T includes a positive pulse duration of T+, a negative pulse duration of T−, and a neutral pulse duration of $T_p$, and wherein at least the positive pulse duration includes at least first and second pulses separated from one another by at least one of a negative pulse and a neutral pulse.

17. An apparatus for dehydrating a porous material using electro-osmosis, comprising:
an anode system;
a voltage generator for producing direct current voltage pulses to be applied to the anode system;
a cathode structure embedded in earth and located to interact electrically with at least a portion of the anode system;
a controller for controlling the voltage generator to produce a pattern of the direct voltage pulses having a pulse period T in a range from about 3 to about 60 seconds, and each pulse period T includes a positive pulse duration of T+ from about 0.7T to about 0.97T, a negative pulse duration of T− from about 0.01T to about 0.05T, and a neutral pulse duration of $T_p$ from about 0.02T to about 0.25T, and wherein each pulse period includes at least two positive pulses separated by at least one of a second negative pulse and a second neutral pulse, and the positive pulse duration of each pulse period comprises a combined duration of the two positive pulses.

18. The apparatus according to claim 17, wherein the controller is programmable to provide a positive pulse duration of T+ from about 0.80T to about 0.95T, a negative pulse duration of T− from about 0.01T to about 0.05T and a neutral pulse duration T from about 0.04 to 0.15.

19. The apparatus according to claim 17, wherein the controller is programmable to provide a positive pulse duration of T+ from about 0.90T to about 0.95T, a negative pulse duration of T− from about 0.01T to about 0.05T and a neutral pulse period $T_p$ from about 0.01T to about 0.05 T.

20. The apparatus according to claim 17, wherein the pulse period duration T is between about 6 seconds and 10 seconds.

21. The apparatus according to claim 17, wherein the two positive pulses are separated by only a neutral pulse.

22. The apparatus according to claim 17, wherein the two positive pulses are separated by only a negative pulse.

23. The apparatus according to claim 17, wherein the two positive pulses are of unequal duration.

* * * * *